July 7, 1925.

F. E. KEITH 1,545,104

AUTO BED

Filed April 12, 1923    2 Sheets-Sheet 1

Inventor.
Frank E. Keith.
by
his Attorney.

July 7, 1925.

F. E. KEITH

AUTO BED

Filed April 12, 1923        2 Sheets-Sheet 2

1,545,104

Inventor.
Frank E. Keith.
by
his Attorney

Patented July 7, 1925.

1,545,104

UNITED STATES PATENT OFFICE.

FRANK E. KEITH, OF LONG BEACH, CALIFORNIA.

AUTO BED.

Application filed April 12, 1923. Serial No. 631,526.

*To all whom it may concern:*

Be it known that I, FRANK E. KEITH, a citizen of the United States, residing at Long Beach, in the county of Los Angeles and State of Califorina, have invented new and useful Improvements in Auto Beds, of which the following is a detailed specification.

One of the necessities for successful and enjoyable automobile touring is the provision of a portable automobile bed having the combined qualities of being comfortable, readily assembled and disassembled, and of occupying a minimum space when disassembled for day time storage. It being the object of my invention to provide an ideal automobile bed I have produced a device combining a comparatively light structure capable of supporting great weight and resisting excessive strain without yielding; a structure capable of erection and intended collapsation with the expenditure of minimum effort, and incapable of accidental collapse; a structure vertically, laterally and longitudinally adjustable to render its installation possible in vehicles of varying size and design; a structure capable of being set up without damaging the interior finish of the vehicle; and a structure capable of being collapsed to form a bundle of small compass whereby it may be conveniently stored away to occupy a minimum of space.

Further objects and features of novelty will be more fully described in connection with the accompanying drawings and following detailed description.

Figure 1:
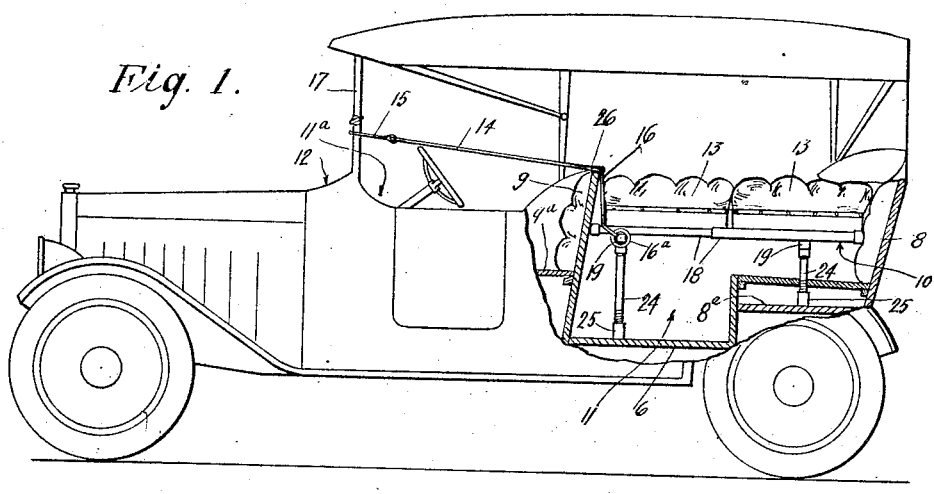
Figure 2:
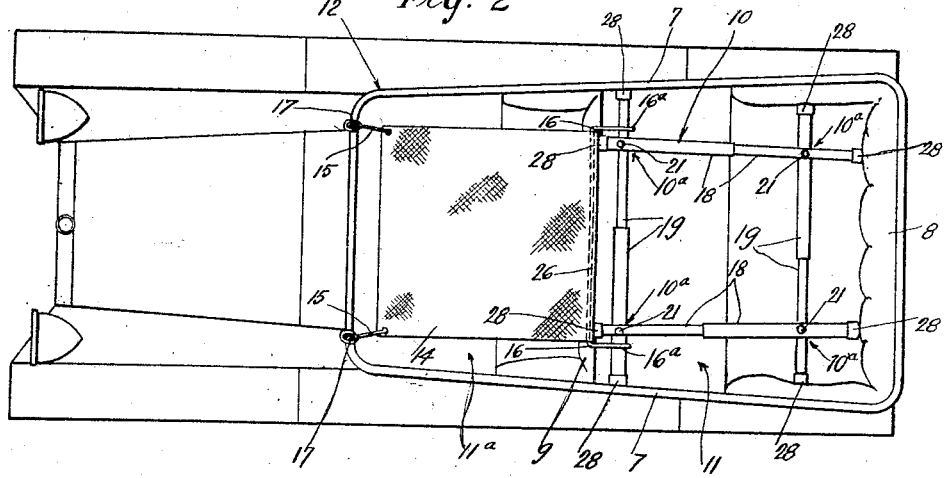
Figure 3:
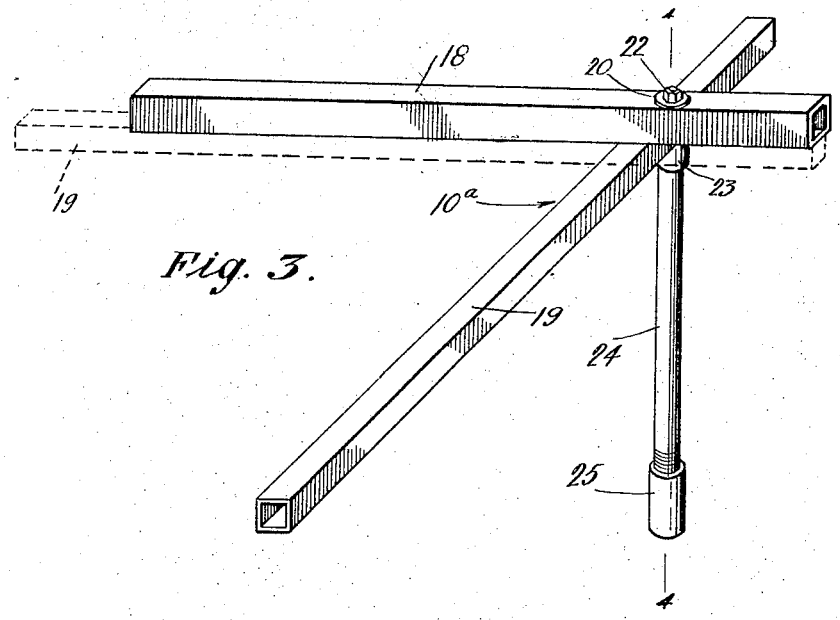
Figure 4:
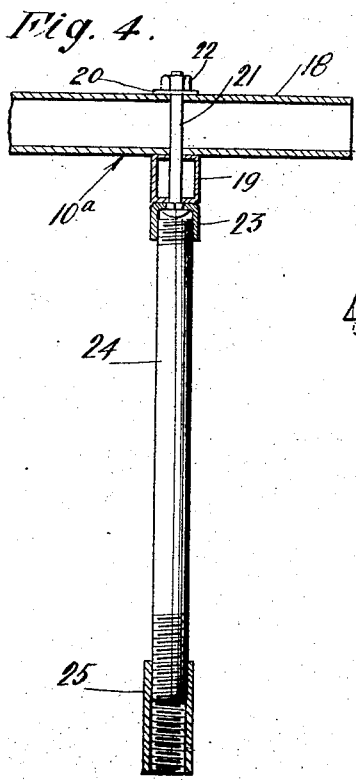
Figure 5:
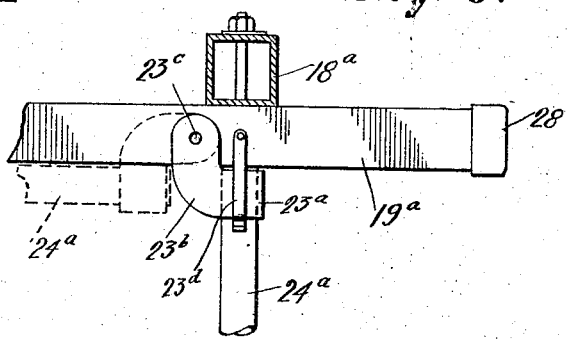

In the drawings, Fig. 1 is a fragmentary view of a vehicle shown partly in elevation and partly in section illustrating the application of an embodiment of my invention thereto; Fig. 2 is a top plan view of Fig. 1 the vehicle top and cushion being removed to more clearly illustrate my invention; Fig. 3 is a perspective view illustrating the structural assembly of a corner unit of my device; Fig. 4 is an enlarged longitudinal section on line 4—4 of Fig. 3, partly broken away and contracted; Fig. 5 is a fragmentary view of a modified leg structure.

To more clearly explain the erection of my device and establish the relative positions which the various elements occupy with respect to the vehicle body 12 I will indicate the rear compartment 11 of such vehicle as being defined by floor 6, sides 7, rear seat 8, and front seat 9.

In general, I provide a collapsible and adjustable supporting frame 10 adapted to occupy the rear compartment 11 in a manner to support the usual vehicle cushions 13 thereupon. I also provide a fabric sling 14 extending from the support 10 over front seat 9 and forward compartment 11ª. The forward extremity of sling 14 may carry ropes or straps 15 adapted to be temporarily lashed to windshield uprights 17 or otherwise suitably attached to vehicle 12. The rear edge of sling 14 may be hemmed as at 26, a cable 16 being reeved therethrough and carrying rings 16ª at its extremities to provide means for removably attaching the sling to support 10.

Frame 10 consists of a plurality of separable units 10ª, each comprising a side rail or bar member 18 connected in horizontal pivotal relation to a cross bar 19. I have illustrated the pivotal connection between rail 18 and bar 19 as being accomplished by a pivot pin 21 retained in position by washer 20 and nut 22. Pin 21 may be in the form of a carriage bolt and serve to non-rotatively retain an internally threaded socket 23 adapted to receive the threaded extremity of leg or post 24, whose lower extremity is also threaded to receive an internally threaded sleeve or foot 25 whereby the effective length of the leg may be varied for vertical adjustment of the unit. It lies within the scope of my invention to provide different means for attaching leg 24 and varying to effective length.

The rail members 18 and bars 19 of the various units 10ª are telescopic with respect to each other and for accomplishing this purpose I have shown such members as being constructed of tubular material having suitable relative telescopic diameters or cross section. By the use of tubular material the resulting structure is comparatively light, yet rigid and strong. I have illustrated the tubular material as being of substantially square cross-section but I may substitute therefor material of triangular, circular or other cross-section. It also lies within the scope of my invention to use angle iron rails and bars arranged in telescopic relation to similar members on the remaining units by the provision of such means as coacting retaining guides.

When the device is disassembled the legs 24 are unscrewed from their respective units 10ª and may be grouped together with the folded rail members 18 and cross bars 19 (see dotted lines in Fig. 3) whereupon the sling 14 may be wrapped and secured about the group by ropes 15 to form a small pack bundle adapted to be easily and inconspicuously carried in the vehicle 12.

In setting up my device the preliminary moves are preferably, but not necessarily, made outside of the vehicle. The units $10^a$ are first extended as shown in full lines (Fig. 3) and then brought into telescopic relation with each other. The frame 10 is then preferably brought into extreme closed telescopic position to be more easily handled and lifted into rear compartment 11. Legs 24 are then screwed into sockets 23 and rings $16^a$ slipped over the extremities of forward cross-bars 19, whereupon the frame 10 is telescopically extended to bring the outer extremities of side rails 18 into contact with seats 8 and 9 and the outer extremities of cross bars 19 into contact with the opposite sides 7, all in a manner to longitudinally and laterally fix frame 10 within compartment 11. If desired, the free extremities of rails 18 and bars 19 may be provided with protecting tips 28 of rubber or the like to prevent them from marring the interior finish of the compartment 11.

Feet 25 on the forward units $10^a$ are adapted to rest on the floor 6 while the feet on the rear units may rest on the seat base $8^a$, and thereafter adjusted, as previously described, to vary the height of frame 10.

It will be noted that the pivotal relation between the rail members 18 and bars 19 of each unit $10^a$ allows the frame 10 to be extended in a manner to bring the opposite rail and bar members out of parallel relation, as viewed in Fig. 2, whereby it is possible to shift legs 24 out of the path of structural obstructions in compartment 11 and to allow a shifting of the frame 10 for accommodating it to ordinary variances of vehicle design.

It is also to be noted that legs 24 are spaced somewhat apart from the free extremities of rail 18 and cross bars 19, whereby they are disposed more nearly beneath the weight to be supported.

Ropes 15 serve to stretch the sling 14 over front compartment $11^a$ whereby the plane of such sling is practically coextensive with the upper faces of cushion 13, the latter being merely shifted from their bases $8^a$ and $9^a$ to adjacent position on frame 10, and extending across and resting on side rails 18. Since cushions 13 are ordinarily springy or resilient, a comfortable bed may be quickly completed by laying blankets or bedding over the top of cushions 13 and sling 14.

In Figure 5 I have shown the legs $24^a$ as hingedly supported on cross bar $19^a$, socket $23^a$ being provided with ears $23^b$ pivotally connected to the bar as at $23^c$. Spring clip $23^d$ may coact with socket $23^a$ to maintain leg $24^a$ in erect relation to bar 19. In collapsing frame 10, spring $23^d$ is relieved from contact with socket $23^a$, and leg $24^a$ is folded on bar 19 to assume the position indicated by dotted lines.

While I have shown and described a particular embodiment of my invention, I do not wish to be limited thereto except for such limitations as a fair interpretation of the claims may import.

Having described a preferred form of my invention, I claim:

1. A corner structure for automobile bed supporting frames, comprising a cross bar, a side bar overlying said cross bar, a pivot pin joining said bar members, and a leg supporting socket secured to one of said members by said pivot pin.

2. A corner structure for automobile bed supporting frames, comprising a cross bar, a side bar overlying said cross bar, a pivot pin joining said bar members, a leg supporting socket secured to one of said members by said pivot pin, and a leg supported in said socket.

In witness that I claim the foregoing I have hereunto subscribed my name this 29th day of March 1923.

FRANK E. KEITH.